United States Patent

Grote

[11] 3,724,177
[45] Apr. 3, 1973

[54] CARTRIDGE FOR FILTER FOR MOISTURE AND OIL VAPOR

[75] Inventor: George A. Grote, Glen Rock, Pa.

[73] Assignees: National Central Bank of York, Pa. Administrator, d.b.n.c.t.a. of the Estate of Willard C. Beach, dec'd; Administrator c.t.a. of the Estate of Mary B. Beach, Hanover, Pa.

[22] Filed: Feb. 11, 1972

[21] Appl. No.: 225,382

Related U.S. Application Data

[63] Continuation-in-part of Ser. No. 37,125, May 14, 1970, Pat. No. 3,678,662.

[52] U.S. Cl. .................55/316, 55/381, 55/387, 55/486, 55/515
[51] Int. Cl. ..............................................B01d 53/16
[58] Field of Search..................55/316, 485-89, 55/512-519, 381-382, 524; 210/484

[56] References Cited

UNITED STATES PATENTS

| | | | |
|---|---|---|---|
| 1,892,982 | 1/1933 | Gartha | 55/512 X |
| 2,214,925 | 9/1940 | Guthrie | 55/387 |
| 2,692,654 | 10/1954 | Pryor | 55/524 X |
| 2,922,488 | 1/1960 | Gruner | 55/316 |
| 3,388,536 | 6/1968 | Nash | 55/513 X |
| 3,464,186 | 9/1969 | Hankison | 55/316 X |
| 3,483,677 | 12/1969 | Pinto | 55/475 X |
| 3,520,416 | 7/1970 | Keedwell | 55/524 X |
| 3,555,787 | 1/1971 | Lustig | 55/179 |
| 3,678,662 | 7/1972 | Grote | 55/387 |
| 3,681,899 | 8/1972 | Grote | 55/503 |

Primary Examiner—Frank W. Lutter
Assistant Examiner—Vincent Gifford
Attorney—C. Hercus Just

[57] ABSTRACT

A cartridge for a filter system to absorb and separate water and oil vapors from gases comprising a cylindrical container connectable in a supply line for said gases and containing at least one such cartridge comprising a seamless cylindrical sleeve, the diameter of said sleeve being slightly greater than the inner diameter of said container so that when the filter unit is supported within said container the periphery of the sleeve will smoothly and tightly engage the inner surface of the container to prevent bypassing of gases between the sleeve and container during use.

14 Claims, 12 Drawing Figures

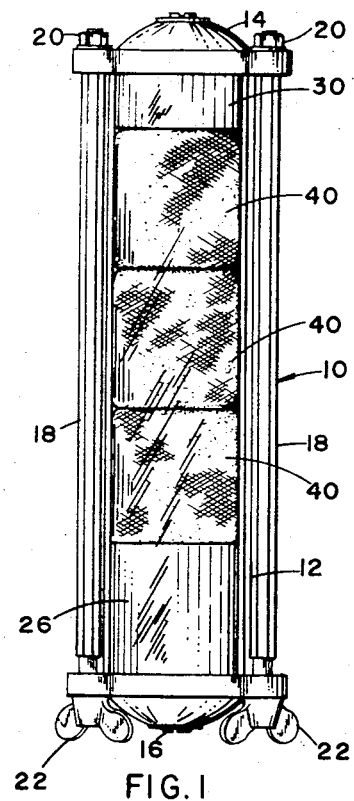
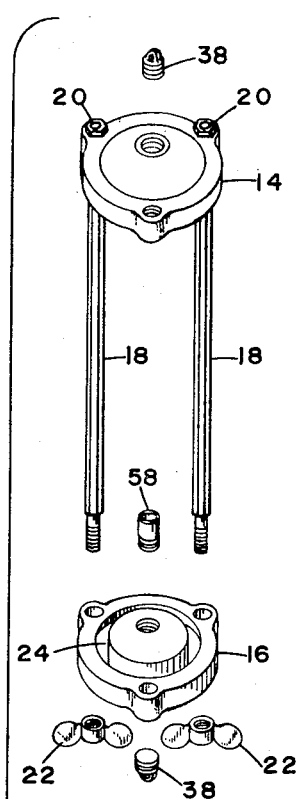
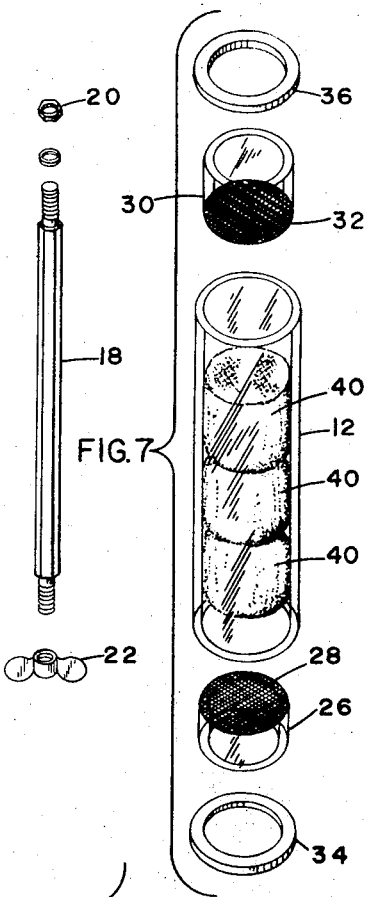
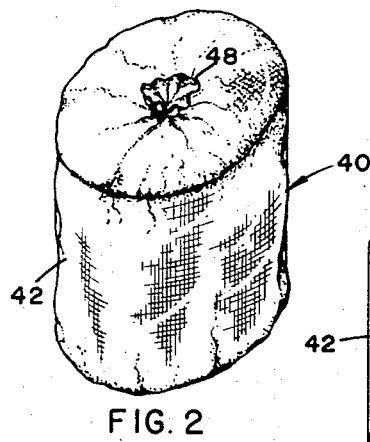
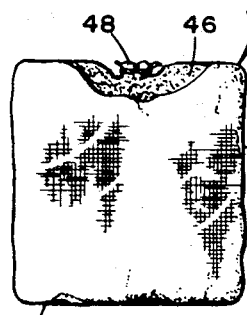
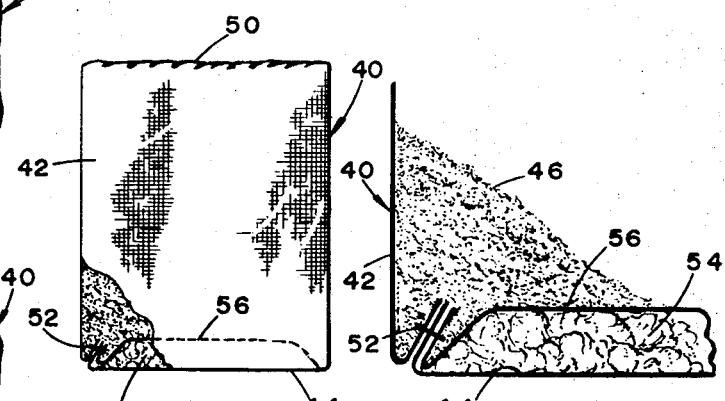

CARTRIDGE FOR FILTER FOR MOISTURE AND OIL VAPOR

CROSS-REFERENCE TO RELATED APPLICATION

Applicant's co-pending application, Ser. No. 53,475, filed July 9, 1970, now U.S. Pat. No. 3,681,899, issued Aug. 8, 1972, pertains to a filter unit having a different housing arrangement from the instant application.

This application is a continuation in part of application Ser. No. 37,125, filed May 14, 1970, now U.S. Pat. No. 3,678,662, issued July 25, 1972. It contains all of the subject matter of said application and, in addition, contains additional material not disclosed in said application. Essentially, the present application is directed to certain types of cartridges for filter units for extracting moisture and oil vapors from gases of various kind, including air.

BACKGROUND OF THE INVENTION

Filter systems including supporting containers and the like which contain filter units formed from textile material enclosing filter material have been known heretofore and are presently in use. Said units, however, have included side members formed from pieces of textile material of predetermined size and opposite parallel edges thereof are stitched to form a seam which extends inwardly and thereby forms a sleeve configuration comprising the sides of the unit. Appropriate porous end members are secured to the portion which forms the sides of the unit. Such arrangement, however, particularly along the seam referred to, inherently forms a channel of limited cross-section but nevertheless capable of permitting channeling or bypassing of unfiltered gases past the filter unit so that less than 100 percent filtering of gases can occur.

Particularly in situations where it is absolutely essential to filter from certain gases all entrained water and oil vapor, for example, such channeling or bypassing of unfiltered gases through said channel formed by said seam cannot be tolerated.

Several typical examples of filters presently available are found in prior U.S. Pats. No. 2,922,488, in the name of Gruner, dated Jan. 26, 1960; No. 3,186,148, in the name of Merrill et al., dated June 1, 1965; No. 3,483,677, in the name of Pinto, dated Dec. 16, 1969; and No. 2,852,095, in the name of de Coriolis et al., dated Sept. 16, 1958. The first of these patents discloses a combination of an inner screen container covered by multi-layers of cheesecloth within a metal housing, while the second patent illustrates a filter pack which is illustrated as being formed from porous material comprising an enclosure for filtering material including diatomaceous or fuller's earth. The third patent shows what is described as a bag of hydrophilic material to function as the cartridge or insert unit. The fourth patent merely discloses what are termed glass fiber pads disposed within a filter cylinder. None of these patents disclose any substantial amount of specific structure of the cartridges or packs which are contained within the housings or casings of the filter units. To the best of applicant's knowledge, only seam-type textile containers have been used heretofore to form filter packs or cartridges and the like in filter systems of the type represented by said patents and it is assumed that the packs shown in these patents are of the seamed type which would permit channeling and bypassing of limited quantities of gas through the channels formed by said seams inherently in the region where they engage the inner walls of the housings or casings for the filter packs, although the patent to de Coriolis et al. discloses certain means to attempt to avoid such by-passing of the pads.

SUMMARY OF THE INVENTION

It is the principal object of the present invention to provide a filter cartridge or unit formed from a seamless cylindrical sleeve of textile material having a predetermined uniform porosity throughout, said seamless sleeve having a diameter only very slightly greater than the inner diameter of the cylindrical container within which it is mounted, the opposite ends of said filter unit being engaged by simple screen type supporting means which force the seamless sleeve into smooth, circumferentially continuous contact with the inner walls of the container so that there is no possibility of any leakage, channeling or bypassing of gases between said seamless cylindrical sleeve of the unit which forms the side walls thereof and the inner surface of the supporting container.

It is another object of the invention to provide such a filter cartridge as referred above, which contains preferably pulverent type absorbing material such as diatomaceous earth, fuller's earth, and the like, said filtering material being contained within the filter unit by means of a disc-like end member which, if desired, may be formed from material similar to that from which said sleeve is formed but, preferably said disc-like end members are formed from special non-woven synthetic resin porous films, details of which are described hereinafter, said members being stitched at the periphery thereof to one end of said sleeve, the raw ends of said connected members at one end of the cartridge extending inwardly in the preferred construction and the opposite end of said cartridge either comprising another disc which is similar to said first-mentioned disc and connected to the opposite end of said sleeve by means which form an outwardly extending seam at the periphery of said opposite end of said sleeve which may be of sufficient length that it may be contracted inwardly toward the axis of the sleeve and thereby aid in compressing the cartridge longitudinally when the cartridge is mounted operatively within the filter unit.

A further object of the invention is to form said sleeve and end members of said cartridge from synthetic resin filaments, such as Nylon, or other appropriate filaments which preferably are substantially completely inert to reaction with contaminants normally found in air which requires filtering by being passed through a filter, especially to remove water and oil vapors therefrom.

A still further object of the invention ancillary to the foregoing object is to form such textile fabric from thermoplastic synthetic resin filaments, whereby suitable fusing may be used in at least certain of the seams on the cartridge.

Details of the foregoing objects and the invention, as well as other objects thereof, are set forth in the following specification and illustrated in the accompanying drawing comprising a part thereof.

DESCRIPTION OF THE DRAWING

FIG. 1 is a side elevation of an exemplary filter system embodying the principles of the present invention.

FIG. 2 is a perspective view of one embodiment of filter unit of the type included in the filter system of FIG. 1.

FIG. 3 is a side elevation of the filter unit shown in FIG. 2, part of the upper portion thereof being broken away to show certain details thereof.

FIG. 4 is a side elevation of a further embodiment of filter unit of the type used in the filter system of FIG. 1, part of one corner of said view being broken away to illustrate certain details of construction therein.

FIG. 5 is a fragmentary enlarged view of one corner of filter unit shown in FIG. 4 to illustrate further details of said construction.

FIG. 6 is an exploded perspective view of the supporting structure for the filter means of the filter system shown in FIG. 1.

FIG. 7 is an exploded perspective view of the filter elements and enclosing means therefor of the type employed in the filter system of FIG. 1.

DESCRIPTION OF THE PREFERRED EMBODIMENTS

Figure 8:
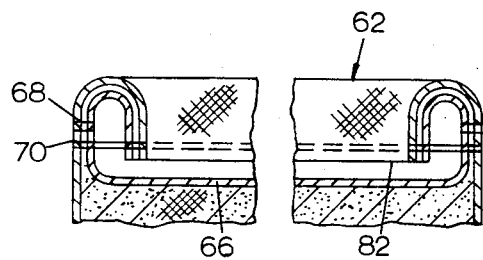
FIG. 8 is a fragmentary enlarged transverse sectional view of the upper, discharge end portion of a further embodiment of cartridge shown in FIG. 9.

The filter system 10 illustrated in exemplary manner in FIG. 1 is the type which is used to insure and guarantee the absorption and resulting separation of 100 percent of water and oil vapor from gases which are passed therethrough at desired speeds. Gases and especially air of the type which are suitable to be filtered by the system comprising the present invention are those which are utilized in food processing, for example, as well as in various chemical processes, air supply for divers, air-operated tools, and many other uses. Air provides an ideal method for agitating materials under process or for moving dried bulk materials, such as flour, sugar, cereals, etc. Highly pure air is required to blend whiskey through agitation and under such circumstances, the slightest odor or taste with which said air might be contaminated cannot be tolerated.

Many chemical processes require absolutely pure air or at least air which is free from water and/or oil vapors. Completely dry and pure air, for example, is used to move and/or mix paint pigments, talc, and many other types of bulk materials where the presence of water vapor would cause clogging or a chemical reaction as in regard to moving Portland cement. In certain types of delicate instruments such as fluidic amplifiers and control circuits, air is used which must be absolutely free from contaminating materials such as water and oil vapors. A substantial number of other uses exists which require, in particular, air or similar gases which are absolutely free from moisture or oil vapors and it is in regard to filtering air to provide the desired kind in such foregoing operations that the present invention finds its principal use.

The several embodiments of filter cartridges comprising the present invention finds its principal use.

The several embodiments of filter cartridges comprising the present invention may be supported in various air and gas filtering packets or housings, including the filter system illustrated in the drawing and particularly in FIG. 1 which comprises a preferably transparent cylindrical sleeve 12 which is best shown in FIG. 7. Said sleeve may be made from appropriate synthetic resin or glass and the wall thickness of such sleeve is selected to render the same capable of withstanding within safe limits the pressure intended to be exerted upon the gases being filtered by the system. The system 10 also is provided with a pair of end or cap members 14 and 16 which are similarly apertured to receive the opposite ends of tie bars 18, the opposite ends of which are threaded to receive connecting nut 20 at one end and, preferably, wing nuts 22 at the opposite ends. The cap members 14 and 16 also preferably are provided with annular recesses 24 which comprise seats for the opposite ends of the sleeve 12.

Referring particularly to FIG. 7 but also to FIG. 1, it will be seen that in the lower portion of the sleeve 12, a lower supporting member 26 is mounted which preferably is cylindrical and the upper end thereof is covered with a supporting disc 28 of metal gauze of appropriate porosity to readily pass gas therethrough without obstruction. The outer diameter of the supporting member 26 preferably closely fits within the inner diameter of the sleeve 12. Similarly, an upper supporting member 30 is provided which also closely fits within the upper end of sleeve 12 and the same also has a supporting disc 32 of metal gauze. The metal gauze discs 28 and 32 are for purposes to be described. Appropriate compressible sealing gaskets 34 and 36 respectively are provided at the lower and upper ends of the assembly shown particularly in FIG. 7, said gaskets respectively abutting the outermost ends of the supporting members 26 and 30. Said gaskets also are seated within the annular recesses 24 respectively provided in the upper and lower cap members 14 and 16. Said cap members also preferably are centrally threaded respectively to receive threaded plugs 38 which may be removed for the installing of inlet and discharge conduits or pipes when the filter system is to be installed within conduit means by which air or other gases to be filtered respectively are delivered to one end of the filter system and the filtered product is removed from the other end.

The most essential part of the filter system 10 comprises at least one and preferably a plurality of filter cartridges or units 40 which constitutes the subject matter of the present invention. Said cartridges or units are of specialized construction and several different embodiments are illustrated. Referring to FIG. 2, the filter unit 40 shown therein is formed from a seamless tube of textile fabric which preferably is manufactured from suitable synthetic resin which is substantially non-reactive with a wide range of contaminating materials normally found in air and gases of the type with which the filter system 10 is highly adaptable for use. Without restriction thereto, Nylon has been found to be very suitable for the formation of such textile material. The porosity of the material also is critical, at least with respect to the type of pulverent material to be contained within the filter units 40. By way of example, a porosity of nor more than 5 microns in the size of the pores has been found quite satifactory. Various types of such pulverent material may be used and, also without restriction thereto, diatomaceous earth and fuller's earth are suitable for such use.

Concerncing the details of the filter units 40, the side walls 42 thereof are formed from said aforementioned seamless tubing, the diameter of which is preferably very slightly larger than the inner diameter of the sleeve 12, whereby when the units 40 are mounted therein and are reasonably compressed for firm support between the metal gauze members 28 and 32 of the lower and upper supporting members 26 and 30, said seamless side walls 42 will firmly and smoothly abut the inner surfaces of the sleeve 12 throughout substantially the entire circumferential area of the side walls 42. By such arrangement, no leakage, channeling or bypassing of air or other gases will occur between the side walls 42 of the filter units and the inner surface of the sleeve 12.

In the embodiment of the invention shown in particular in FIG. 2, bottom 44 preferably comprises a disc of textile material which may be similar to that from which the seamless side wall tube 42 is formed, or otherwise, as described hereinafter relative to an additional embodiment of the filter cartridge or unit. The perimeter of the disc is affixed by appropriate stitching to one end of the side wall tube 42. After the formation of such unit, it is filled with the desired pulverent material 46 and, as shown in FIGS. 2 and 3, the upper end of the seamless sleeve which forms the side walls 42 is contracted and tightly tied to form the closure 48.

As indicated above, the synthetic resin from which the textile material of the side walls and bottom of the unit 40 are formed is thermoplastic, especially to insure that the closure 48 is absolutely tight so as to prevent any escape of the pulverulent filtering material 46 therethrough, after the tying of the closure 48, a heated tool may be applied against the puckered and contracted closure, such as centrally thereof, to fuse said closure in a manner to eliminate any minute hole or passage which otherwise might exist in the closure as the result of only tying the same tightly.

In the embodiment of the invention shown in FIGS. 4 and 5, rather than form the top of the unit 40 by contracting the upper end of the side wall tube 42, another disc 50 which also is formed, for example, from the same type of material as the side wall tube 42, or otherwise, is secured at its periphery by appropriate overcast stitching to the upper end of the sleeve 42.

As best shown in the lower left corner of FIG. 4 and also in enlarged manner in FIG. 5, the lower end of sleeve 12 shown therein is turned inwardly. The periphery of the bottom disc 44 also is turned inwardly and the same is stitched together by the exemplary stitching represented by the cross line 52 in said figures. This is done in customary manner by stitching the two edges together and then turning the resulting product inside out. In addition, the stitching of the top disc 50 in the upper end of the side wall tube 42 may be similarly accomplished except for a short distance which, after filling of the filter unit enclosure thus formed is finally closed by suitable overcast stitching or the like.

A further feature of the present invention comprises the provision of a layer of highly absorbent material such as absorbent cotton 54 which is of appropriate thickness and is maintained in desired formation by enclosing the upper surface thereof with another disc of porous material such as gauze 56. Said gauze is in the form of a disc and the periphery thereof also is stitched to the adjacent edges of bottom disc 44 and the lower end of side wall tube 42, whereby the row of stitching 52 will secure all three of said elements together.

In the foregoing description, the filter system 10 as well as the filter units 40 have been referred to as having upper and lower ends and the like but it is to be understood that these terms are not restrictive and pertain only to the specific illustration in the drawing. While under most conditions of use, the filter system 10 will be mounted vertically, it is to be understood that under some specialized circumstances, it may be desirable to mount the same so as to extend in other directions than vertical. Thus, the terms upper and lower, top and bottom, etc., are used only in relation to the illustrations on the drawing for purposes of convenience.

With respect to the filter units 40 illustrated in FIGS. 4 and 5 in which the layer of highly absorbing material 54 is illustrated at one end, said end is preferred to be the inlet end of the filter unit and thus said ends of the units, when mounted within the sleeve 12, are disposed toward the inlet end of the filter system 10. Such inlet end normally is in the bottom cap member 16 and the threaded opening therein preferably also contains a small nipple 58 which is of suitable height to serve as a standpipe. The height of said nipple, however, is substantially less than the height of the lower supporting member 26 and the purpose of the same is to prevent any accumulation of drippings or drainage from the filter units 40 from running into the inlet conduit connected to the bottom cap member 16, for example.

In view of the disposition of the filter units 40 within the sleeve 12 in such manner that the highly absorbent layer 54 is nearest the inlet end of the filter system, such absorbent layer will rapidly absorb water vapor in particular and thus quickly initiate dehydration of the incoming stream of gas which is to be filtered. The pulverent material 46 also is highly capable of absorbing not only water vapor but oil vapor as well and when, for example, the lowermost filter unit 40 shown in FIG. 1, for example, becomes substantially saturated, the economy of the system becomes evident from the fact that the lower saturated filter unit 40 may be removed while the remainder of the stack of such units may be moved downwardly and a new unit mounted at the upper end of said stack. This can be done conveniently by requiring only removal, for example, of the lower cap 16, followed by complete removal of all of the filter units 40, after which the new replacement unit is first inserted into the lower end of tube 12, followed by the partially used filter units 40, after which the cap 16 is replaced and the attachment of the wing nuts 22 completes the assembly operation.

Care should be exercised in mounting the filter units 40 within the tube 12 to insure the smooth disposition of the seamless tubular side walls 42 in order that the major contribution of the present invention will be effective, namely, the prevention of any leakage, channeling or bypassing of unfiltered gases between said seamless tubular side walls 42 of the units 40 and the inner surface of the sleeve 12. The preferred formation of the sleeve 12 from transparent material also greatly facilitates the checking of the condition of the filter system 10 since the degree of saturation of the individual units readily may be seen visually through said sleeve.

Figure 9:
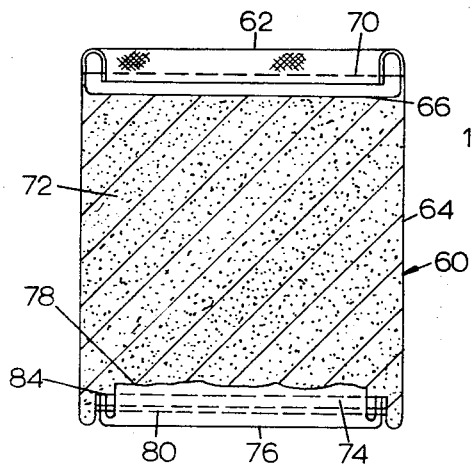
FIG. 9 is a vertical sectional view of another embodiment of cartridge comprising part of the present invention.
Figure 10:
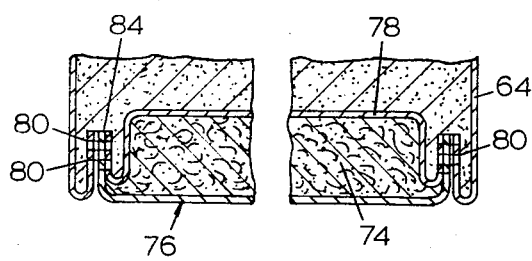
FIG. 10 is a fragmentary enlarged transverse sectional view of the lower, inlet end of the embodiment of cartridge shown in FIG. 9.

Referring to FIGS. 8-10, a filter unit 60 is illustrated which, in general, embodies most of the details fo the filter unit 40 shown in the preceding figures with the essential difference that the seam 62 which is uppermost in use is different from the uppermost seam in the unit 40. Referring particularly to FIG. 8, in which the uppermost seam 62 is shown in enlarged manner, in detail, it will be seen that the preferably seamless side wall 64 initially extends axially outwardly from the unit and the periphery of the end disc 66 is arranged in abutting relationship with the upper end of the seamless side wall 64 and the two members are secured together by one or two rows of stitches 68 which extend circumferentially around the side wall 64.

The extending adjacent or abutting ends of the side wall 64 and end disc 66 then are turned inwardly upon themselves, as clearly shown in FIG. 8, and additional rows of stitches 70 are sewn through the overlying end portions of the normally upper end of the filter unit 60 so as to secure the upper end of said unit permanently in such condition.

It will be understood that the filter unit 60 contains pulverulent material 72 which, for example, is similar to the material 46 in the above-described embodiment shown in the preceding figures. Also, the normally lower, or inlet end of the filter unit 60, in the relationship shown in FIG. 9 of the drawings, contains a layer 74 of absorbing, fibrous material, such as absorbent cotton, which functions similarly to the layer 54 illustrated specifically in FIG. 4 and 5 of the preceding embodiment. Said layer of absorbing material 74 is enclosed between an outer disc 76 and an inner disc 78 of porous textile material which, for example, may be similar to that from which the side wall sleeve 64 is formed. The peripheries of both of said discs and the lower end of the side wall sleeve 64 are secured by a plurality of circ mferentially extending rows of stitches 80. It further will be seen from FIG. 9 and also especially from FIG. 10, that the seam formed by the rows of stitches 80 extends inwardly into the unit 60.

Further, the purposes of securing both the upper and lower seams of the unit 60 in permanent condition, as well as to prevent any tendency for the pulverulent filter material 72 to migrate through said seams, it has been indicated hereinabove that the material from which both the discs 66, 76 and 78 are formed preferably is of a thermoplastic nature, after the stitches 68 have been applied to the uppermost seam and the stitches 80 have been applied to the lowermost seam, before the lattermost seam has been turned inside out, the ends of the peripheries of the discs and the terminal ends of the sleeves are fused, by heat, to provide an end seal 82 in uppermost seam 62, and an end seal 84 in the lowermost seam shown in detail in FIG. 9 and also particularly in FIG. 10.

Further in accordance with the principles of the invention, it is intended that, in particular, the upper end disc 66 as well as the lower end discs 76 and 78 may be f rmed not from the same material as that of the side wall sleeve 64, but reather from a special material formed from spun bonded polyester fibers sold at present under the trademark REEMAY, and manufactured by the Dupont Company in accordance with a process which they have developed. Said material is porous but provided with very fine pores, all of which are less than 5 microns in transverse dimension. The material is not woven, but rather, heterogeneous disposition of fibers of polyester nature are disposed in a preferred thickness and arrangement, followed by the application of heat to bond the fibers into a permanent structure. Said material is substantially nonreactive with a wide range of gases and vapors intended to be filtered by use of the filter units comprising the present invention. Further, said material is highly durable in use. In addition to filtering gases to be passed through the filter units, the discs formed from said material are highly capable of preventing the escape of fine dust particles of the pulverulent filtering material 72 from either end of the unit in use. Discs formed from said material also are readily capable of being secured by stitches to the opposite ends of the seamless side wall tube 64, for example.

Figure 11:
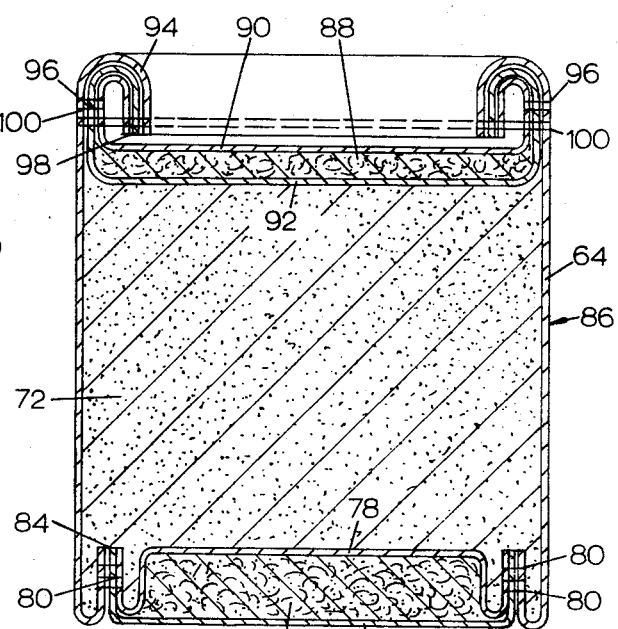
FIG. 11 is a vertical sectional view of a still further embodiment of the invention in which principles of the invention are used.

Still anotehr embodiment of the invention is illustrated in detail in FIG. 11 in which it will be seen that the upper, or discharge end of the filter unit 86 also is provided with a layer of absorbing fibrous material 88 which is disposed between an outer disc 90 and an inner disc 92 of porous textile material which, for example, may be either of the same type of material as that from which the seamless side wall 64 is formed or they may be formed from the aforementioned polyester material having the desirable properties set forth above. In forming said upper end of the filter unit 86, the peripheral edges of the discs 90 and 92 are arranged in contiguous, overlying relationship and then are shaped somewhat cylindrically and disposed in contiguous relationship with the upper end portion 94 of the seamless side wall sleeve 64 and the three layers of said adjacent peripheral and end portions are secured together by circumferentially extending rows of stitches 96. If desired, and particularly since said material is thermoplastic, the adjacent, terminal ends of all of said members may be additionally affixed together by the application of heat to form a fused seal 98, following which the outwardly extending seam is then folded inwardly upon itself and is secured permanently in such operative condition by one or more additional circumferential rows of stitches 100.

The lowermost or inlet end of the unit 86, as shown in FIG. 11, preferably is identical in construction to the lowermost end of the filter shown in FIGS. 9 and 10.

Figure 12:
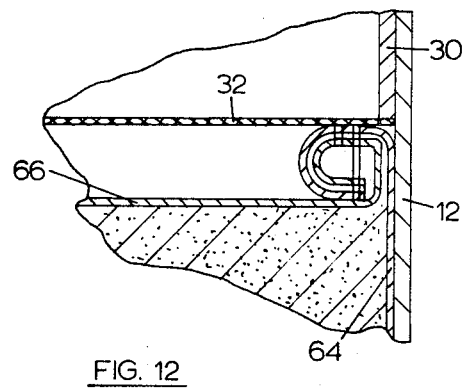
FIG. 12 is a fragmentary vertical sectional view of the upper, discharge end of the cartridge shown in FIGS. 8 and 9 when mounted in operative position within a filter unit wherein the seam of said end is contracted inwardly against the upper screen member of the filter unit.

Therefore, attention is directed above to the foregoing description of said details. By arranging the lowermost seam to extend inwardly into the interior of the units 60 and 86, while providing axially outwardly extending annular seams at the upper or discharge ends of the units, the types of such outwardly extending seams shown particularly in FIGS. 8, 9 and 11 cause such units, when placed operatively within the sleeve 12 of the filter system 10 shown in FIGS. 1 and 7, for example, to be placed under axial compression. This is due to the axial dimensions of the units with respect to the distance between the upper and lowermost metal gauzes 32 and 28 being such that when said filter units are disposed in operative relationship within the sleeve 12 and the end caps 14 and 16 are secured operatively in place, the upper seam of at least the uppermost unit, when engaging the transverse disc of metal gauze 32, for example, will be somewhat bent or folded inwardly as shown in exemplary manner in FIG. 12, particularly in regard to the embodiment of filter unit shown in FIGS. 8 and 9. However, it is to be understood that the filter unit 86 shown in FIG. 11 likewise will have its upper seam disposed in the manner generally illustrated in FIG. 12 when one or more of said units are mounted operatively within the filter system 10, it being understood that enough of said units will be utilized to place all of the same under axial compression. Such axial compression provides forces which cause the pulverulent material 72 within the units to expand radially outward and thus force the seamless side wall sleeve 64 into firm abutting relationship against the inner surfaces of the sleeve 12, it being understood that the diameter of said seamless side wall sleeve 64 preferably is slightly greater in diameter than the inner diameter of the sleeve 12 of the filter system 10.

While the invention has been illustrated and described in its several preferred embodiments, it is to be understood that the invention is not to be limited to the precise details illustrated and described since the same may be carried out in other ways falling within the scope of the invention as illustrated and described.

I claim:

1. A filter unit for use in a filter system for absorbing and separating water and oil vapor from gases when passed through said unit, said unit comprising a seamless cylindrical sleeve of predetermined length formed from textile material having a uniform fine porosity throughout; pulverulent filter material compactly enclosed therein, an end disc member formed from textile material similar to that of said sleeve and secured to one end of said sleeve, the opposite end of said unit being formed from material similar to that of said sleeve and extending across said end to retain said pulverulent material therein, a layer of absorbing fibrous material extending across the inner surface of one end of said filter unit and adapted to rapidly absorb water and oil vapors from gaseous material passed through said one end of said filter unit, and a disc member of porous material extending across the inner surface of said layer of absorbing material and secured at the edges thereof to said one end of said sleeve by stitches to position said layer of material operatively within said unit said stitches additionally securing said end disc member to said one end of said sleeve and said stitches further forming a seam which extends inwardly into said unit.

2. The filter unit according to claim 1 in which said opposite end of said unit comprises a contracted end of said sleeve and includes means tightly sealing the same against the outward passage of filter material contained within said unit.

3. The filter unit according to claim 2 in which the textile material from which said sleeve is formed is thermoplastic synthetic resin and said contacted end of said unit being fused to seal the same against the escape of filter material from within said unit.

4. The filter unit according to claim 1 in which the opposite end of said unit also comprises a disc member formed from material similar to that from which said sleeve is formed and said disc being secured by stitching to said opposite end of said sleeve.

5. The filter unit according to claim 1 in which said layer of absorbing fibrous material within said u it adjacent said one end thereof is adjacent that end of said unit which is intended to be first contacted by gases directed to the filter unit for purposes of being filtered thereby.

6. The filter unit according to claim 1 in which a layer of absorbing fibrous material extends across each of the opposite ends of said unit between which said pulverulent filter material is disposed.

7. The filter unit according to claim 6 in which a disc of porous textile material also extends across the inner surface of each of said layers of absorbing fibrous material to confine and support said layers of the latter in operative position within said opposite ends of said filter unit.

8. The filter unit according to claim 7 in which said discs of textile material at said opposite end of said unit are secured at the peripheries thereof by stitched seams to the adjacent ends of said sleeve of said unit.

9. The filter unit according to claim 8 in which the stitched seam at the opposite end of said unit extends axially outward and is folded over inwardly upon itself and having additional stitches extending through said seam to secure the same in such folded condition.

10. The filter unit according to claim 7 in which said disc members of textile material are all formed from bonded polyester fibers.

11. The filter unit according to claim 10 in which said disc members of textile material have pores less than 5 microns in cross sectional dimension.

12. The filter unit according to claim 1 in which said disc members of textile material are formed from bonded polyester fibers.

13. The filter unit according to claim 12 in which said disc members have pores less than 5 microns in cross-sectional dimension.

14. The filter unit according to claim 1 in which the opposite end of said unit is covered by a disc secured to said sleeve by a seam which extends axially outwardly from said unit and is folded over upon itself and having additional stitches extending through said seam to secure the seam in such folded condition.

* * * * *